United States Patent [19]
Heldt

[11] 4,114,979
[45] Sep. 19, 1978

[54] FIBER OPTIC CONNECTOR

[75] Inventor: Earl R. Heldt, Monta Vista, Calif.

[73] Assignee: Hewlett-Packard Company, Palo Alto, Calif.

[21] Appl. No.: 792,375

[22] Filed: Apr. 29, 1977

Related U.S. Application Data

[63] Continuation-in-part of Ser. No. 731,068, Oct. 8, 1976, abandoned.

[51] Int. Cl.² ............................................. G02B 5/14
[52] U.S. Cl. ................................................. 350/96.21
[58] Field of Search ............................. 350/96 B, 96 C

[56] References Cited

U.S. PATENT DOCUMENTS

| | | | |
|---|---|---|---|
| 3,936,145 | 2/1976 | McCartney | 350/96 C |
| 3,946,467 | 3/1976 | Lukas | 350/96 C |
| 3,982,815 | 9/1976 | Nakayama | 350/96 C |

FOREIGN PATENT DOCUMENTS

| | | | |
|---|---|---|---|
| 2,273,289 | 12/1975 | France | 350/96 C |
| 2,237,445 | 2/1974 | Fed. Rep. of Germany | 350/96 C |

OTHER PUBLICATIONS

R. L. Thiel, R. E. Love, R. L. Smith, "In-Line Connectors for Multi-Mode Optical Waveguide Bundles," Applied Optics, vol. 13, No. 2, Feb. 1974, pp. 240-242.

*Primary Examiner*—John K. Corbin
*Assistant Examiner*—Rolf Hille
*Attorney, Agent, or Firm*—F. D. LaRiviere

[57] ABSTRACT

The retainer sleeve of a three piece ferrule suitable for very small diameter optical fibers has an outside diameter threaded portion at the closed end so that, after the ferrule and optical fiber have been assembled, an outer sleeve, having a correspondingly threaded inside diameter, can be used to adjust the optical fiber end to be positioned flush with the end face of the ferrule during assembly. The design of the outside threaded sleeve for retaining the connector of two fibers to be connected is improved by inserting a shim sleeve of molded, pliable material having a "D"-shaped inside diameter to apply force to the outside diameter of the ferrules when inserted therein for reliable, concentric snug-fit.

7 Claims, 5 Drawing Figures

FIBER OPTIC CONNECTOR

CROSS-REFERENCE TO RELATED APPLICATION

This is a continuation-in-part of U.S. Patent Application Ser. No. 731,068 entitled IMPROVED FIBER OPTIC CONNECTOR filed by Earl R. Heldt on Oct. 8, 1976, now abandoned.

BACKGROUND AND SUMMARY OF THE INVENTION

In end-to-end coupling of two optical fibers, the closer together the two fiber ends can be brought together and aligned on their common center-line, the less light or power is lost. In connectors for such end-to-end coupling having ferrules to retain the optical fibers, the cleaved end of an optical fiber is initially just flush with the end surface of the ferrule. Thereafter, when the rear portion of the retainer sleeve of the ferrule is crimped to the jacket of the optical fiber cable, the cleaved end of the optical fiber may recede away from the face of the ferrule and against which the face of the second ferrule housing the second optical fiber would abut. Such a connector assembly is referred to in U.S. Patent Application Ser. No. 698,392, entitled "Fiber Optic Connector", filed June 21, 1976 by Earl R. Heldt. In that connector, the cleaved end of the optical fiber recedes from the face of the ferrule. Hence, a gap between the cleaved ends of the fibers to be coupled results during assembly of the outer jacket of the optical fiber cable to the end of the ferrule sleeve.

In addition, the cost of the split, outside threaded sleeve as shown in the above-referenced patent application and into which the connector of the two fibers to be connected is inserted, is high owing to the machining required to hold the close tolerance of the inside diameter. Typically the tolerances of the inside diameter of the outside threaded sleeve and the ferrule were not adequate to maintain fiber-to-fiber concentricity. To improve alignment tolerance and to maintain production costs, the sleeve was slit in order to allow it to act as a spring and take up the clearance between its inside diameter and the ferrule outside diameter. However, the amount of force the spring developed in this approach was unpredictable. To improve predictability of fiber alignnment, a double leaf spring was machined into the sleeve as also described in the above-mentioned patent application, while improvement was achieved the cost was high. The present invention abandons the use of slits and leaf springs in favor of an outside threaded sleeve having a uniform inside diameter into which a shim sleeve of molded, pliable material having a "D"-shaped inside diameter is slip-fit therein. The inside diameter of the shim sleeve acts as a spring on the outside diameter of the connector ferrules.

DESCRIPTION OF THE PREFERRED EMBODIMENT

Figure 1:
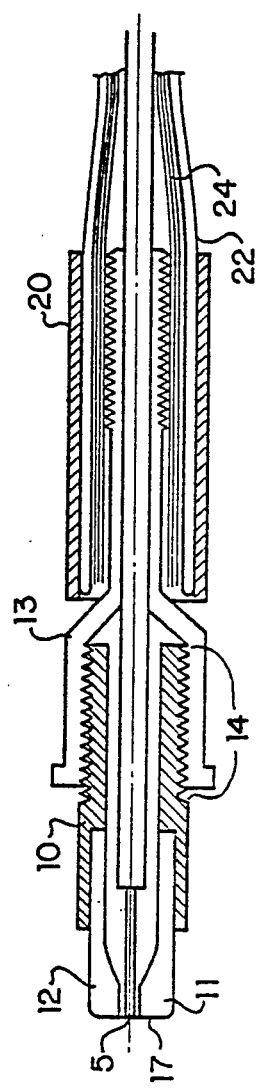
FIG. 1 is a cross-sectional view of an improved fiber optic connector constructed according to the principles of the present invention.

The present invention relates to fiber optic connectors specifically of the type described in U.S. Patent Application Ser. No. 698,392, entitled "Fiber Optic Connector" filed June 21, 1976, filed by Earl R. Heldt, which is incorporated by reference as amended as if fully set forth herein. Referring to FIG. 1, the ferrule assembly comprises half shells 11 and 12 and sleeve 10. The ferrule is joined to optical fiber 5 in the manner described in the above referenced patent application wherein sleeve 10 corresponds to sleeve 13 in that application but is distinguished therefrom by outside threaded portion 14 extending behind the retained half shells. Sleeve 13, having an inside diameter threaded portion for coupling to the threaded portion of sleeve 10, also has an outside threaded portion corresponding to outside threaded portion 44 of ferrule 40 in the above-referenced patent application. The outside threaded portion is effective for gripping the inside surface of cable jacket 22 through kevlar strands 24 when sleeve 20 is installed and crimped in place.

The above-described assembly of sleeve 10 with sleeve 13 assures that the cleaved end of optical fiber 5 may be adjusted to be exactly flush with end face 17 of the ferrule assembly during or after the crimping of sleeve 20 to the outer jacket of the optical fiber cable. The integrity of that final adjustment is assured by the use of interference fit threads on the outside diameter of sleeve 10 and the inside diameter of sleeve 13.

Figure 2:
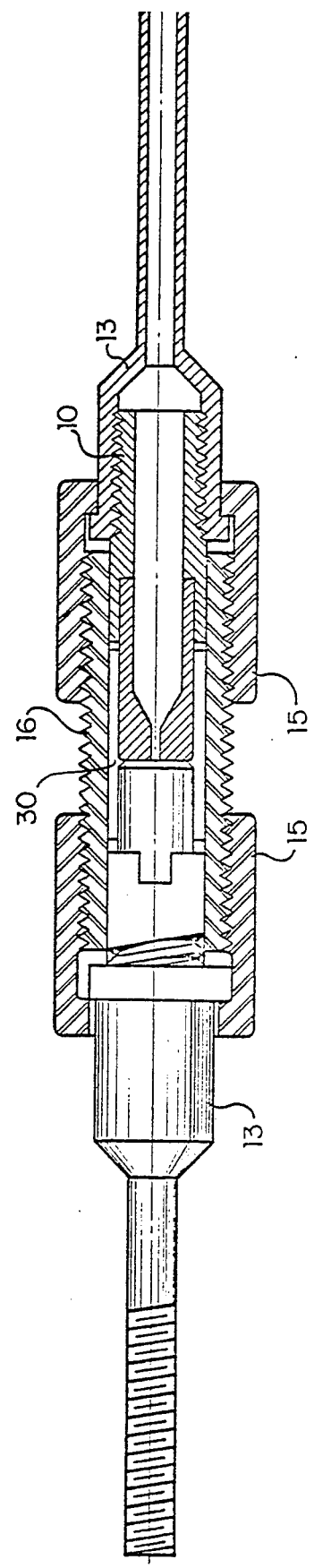
FIG. 2 is a cross-sectional view of end-to-end coupling of two optical fibers, each employing the connector of FIG. 1 and a coupling sleeve constructed according to the present invention.

Referring now to FIG. 2, two connectors of the configuration shown in FIG. 1 have been coupled together via sleeve 16 and retaining nuts 15. Sleeve 16 corresponds to sleeve 71 in the above-referenced patent application; however, its configuration does not include any slits or fingers 81. Sleeve 16 simply comprises a cylindrical sleeve having outside threads corresponding to the threads of retaining nuts 15 and having a uniform, smooth-finish inside diameter.

Figure 3:
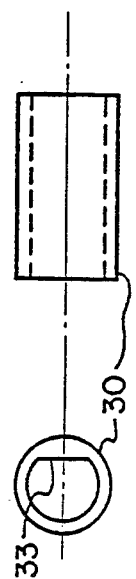
FIG. 3 is a side and end view of a shim sleeve constructed according to the present invention.

The assembly of FIG. 2 includes sleeve 30, the configuration of which is shown in FIG. 3. Sleeve 30 is molded of a plastic or other resilient, pliable, moldable material, such as delrin, and has a uniform outside diameter. The inside diameter of sleeve 30, however, is "D"-shaped, which includes flat face 33. Sleeve 30 assures repeatable snug-fit, axial alignment of the optical fibers contained in the connectors of the configuration shown in FIG. 1. The "D"-shaped inside diameter of sleeve 30 applies force orthogonal to the longitudinal axis of each of the ferrules inserted therein by interfering therewith.

Figure 4A:
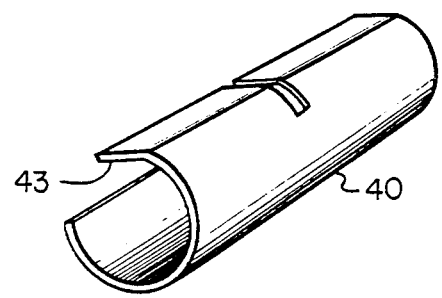
FIG. 4a is a perspective view of a spring sleeve constructed according to the present invention.
Figure 4B:
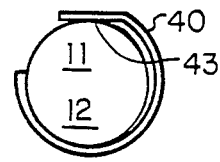
FIG. 4b is an end view of the spring sleeve of FIG. 4a shown with the ferrule assembly of the fiber optic connector of FIG. 1 inserted.

Referring now to FIGS. 4a and 4b, spring sleeve 40 comprises another embodiment of sleeve 30. Spring sleeve 40 is constructed of any resilient, spring-like, formable material such as spring steel, beryllium copper and the like. This embodiment is essentially a three-quarter cylinder having approximately 0.0001 inch thick walls, a portion of its wall being removed and another portion of its wall being flattened along its entire length. Spring sleeve 40 also assures repeatable, snug-fit axial alignment of optical fibers contained in the connectors of the configuration shown in FIG. 1 in the same manner as sleeve 30 and has a longer useful life.

I claim:

1. A fiber optic connector for end-to-end connection of individual optical fiber cables having an optical fiber, a fiber jacket and a cover, said connector comprising:
   a ferrule, including two half shells and a retainer sleeve having a portion of its outside diameter threaded, for retaining the optical fiber and fiber jacket;
   a sleeve for retaining the cover; and
   an adjustment sleeve having male threads for coupling to the inside surface of the optical fiber cover and female threads for coupling to the threaded portion of the retainer sleeve, said adjustment sleeve being effective for adjusting the end of the optical fiber flush with the end face of the ferrule after the cover is crimped thereto.

2. A fiber optic connector as in claim 1 wherein the outside diameter threaded portion of the retainer sleeve and the female threads of the adjustment sleeve are interference threads.

3. A fiber optic connector as in claim 1 further including an inside threaded shoulder nut and an outside threaded sleeve having a uniform inside diameter for receiving a second fiber optic connector including an inside threaded shoulder nut, said outside threaded sleeve being effective for coupling the shoulder nuts, and including a shim sleeve of pliable, moldable material for assuring repeatable, snug-fit, axial alignment of the optical fibers in said outside threaded sleeve.

4. A fiber optic connector as in claim 3 wherein said shim sleeve has a uniform outside diameter approximately equal to the inside diameter of the outside threaded sleeve and having a "D"-shaped inside diameter;
   the outside diameter of said shim sleeve providing an interference fit with the inside diameter of said outside threaded sleeve.

5. A fiber optic connector as in claim 3 wherein the "D"-shaped inside diameter of the shim sleeve is effective for applying force orthogonal to the longitudinal axis of each of the ferrules inserted therein.

6. A fiber optic connector as in claim 3 wherein said shim sleeve comprises an approximately three-quarter cylinder having a portion of its wall flattened along its entire length;
   said outside diameter of said shim sleeve providing an interference fit with the inside diameter of said outside threaded sleeve;
   the inside diameter of said flattened portion of the shim sleeve providing an interference fit with the outside diameter of the ferrules.

7. A fiber optic connector as in claim 6 wherein said flattened portion of the shim sleeve is cut into two approximately equal halves to form two interference-fitting portions thereof.

* * * * *